United States Patent
Beedon et al.

(10) Patent No.: US 6,935,555 B2
(45) Date of Patent: Aug. 30, 2005

(54) METHOD OF BRAZING AND ARTICLE MADE THEREFROM

(75) Inventors: Kent W. Beedon, Greensburg, PA (US); Phillip Dowson, Greensburg, PA (US)

(73) Assignee: Elliott Turbomachinery Co., Inc., Jeannette, PA (US)

( * ) Notice: Subject to any disclaimer, the term of this patent is extended or adjusted under 35 U.S.C. 154(b) by 267 days.

(21) Appl. No.: 10/258,405

(22) PCT Filed: Apr. 27, 2001

(86) PCT No.: PCT/US01/13636

§ 371 (c)(1),
(2), (4) Date: Oct. 23, 2002

(87) PCT Pub. No.: WO01/83157

PCT Pub. Date: Nov. 8, 2001

(65) Prior Publication Data

US 2003/0057263 A1 Mar. 27, 2003

Related U.S. Application Data

(60) Provisional application No. 60/200,206, filed on Apr. 28, 2000.

(51) Int. Cl.$^7$ ............................................. B23K 31/02
(52) U.S. Cl. ................... 228/200; 228/245; 228/262.42; 29/889.1
(58) Field of Search ............................... 228/245–262, 228/200, 46; 29/889.1–889.722; 148/219, 229, 232–233, 545, 547–548, 637, 647, 654, 660

(56) References Cited

U.S. PATENT DOCUMENTS

| | | | |
|---|---|---|---|
| 3,615,920 A | * 10/1971 | Talento | ........................ 148/517 |
| 4,148,973 A | * 4/1979 | Sexton et al. | ................ 428/680 |
| 4,349,145 A | * 9/1982 | Shinopulos et al. | ......... 228/208 |
| 4,620,662 A | 11/1986 | Driggers | |
| 4,726,508 A | 2/1988 | Carpenter | |
| 4,801,072 A | * 1/1989 | Henschel | ..................... 228/245 |
| 4,886,203 A | 12/1989 | Puzrin et al. | |
| 5,033,938 A | * 7/1991 | Fraser et al. | ................ 416/224 |
| 5,086,968 A | * 2/1992 | Fawley et al. | .............. 228/119 |
| 5,190,596 A | 3/1993 | Timsit | |
| 5,348,215 A | * 9/1994 | Rafferty et al. | ............. 228/181 |
| 5,424,140 A | * 6/1995 | Rabinkin | ..................... 428/606 |
| 6,074,604 A | 6/2000 | Saito et al. | |
| 6,112,971 A | 9/2000 | Castaldo et al. | |
| 6,200,690 B1 | * 3/2001 | Rabinkin | ..................... 428/606 |
| 6,257,483 B1 | 7/2001 | Inaba | |
| 6,378,761 B2 | * 4/2002 | Eulenstein et al. | ......... 228/246 |
| 6,413,649 B2 | * 7/2002 | Kepniss et al. | ............. 428/567 |
| 6,491,168 B1 | * 12/2002 | Lutz et al. | .................. 210/402 |
| 6,656,292 B1 | * 12/2003 | Rabinkin et al. | ............. 148/24 |
| 2002/0112350 A1 | * 8/2002 | Rabinkin | ................. 29/890.03 |
| 2003/0057263 A1 | * 3/2003 | Beedon et al. | ............. 228/182 |
| 2004/0108366 A1 | * 6/2004 | Rabinkin et al. | ........... 228/183 |

* cited by examiner

*Primary Examiner*—Kiley S. Stoner
(74) *Attorney, Agent, or Firm*—The Webb Law Firm

(57) ABSTRACT

A method of brazing stainless steel components to form a complex shape such as an impeller. The method includes the steps of providing the stainless steel components shaped and formed from a selected stainless steel alloy; providing a brazing alloy having a selected composition and compatibility with stainless steel; heating the stainless steel components and brazing alloy for a controlled time to a liquidus temperature to effect brazing; cooling the stainless steel components and brazing alloy to a quench temperature substantially lower than the liquidus temperature of the brazing alloy to provide a tensile strength of greater than about 20 Ksi in the brazing alloy; and quenching the assembly from the quench temperature to a temperature of less than about 400° F. in a given time to provide a brazed assembly free of distortion and cracks with desired mechanical properties in the stainless steel components by virtue of the thermal treatment.

13 Claims, 4 Drawing Sheets

METHOD OF BRAZING AND ARTICLE MADE THEREFROM

This application claims the benefit of Provisional Application No. 60/200,206, filed Apr. 28, 2000.

BACKGROUND OF THE INVENTION

1. Field of the Invention

This invention generally relates to a method of brazing stainless steel components and, more particularly, to brazing complex shapes of stainless steel. The invention relates to a method of brazing, accompanied by a subsequent controlled cooling and quenching treatment for forming an integral assembly from a plurality of separate stainless steel components of complex geometry to prevent cracking thereof. In addition, the invention relates to an article made in accordance with the method, most preferably, a stainless steel impeller assembly.

2. Background Art

Welded assemblies, such as impellers, are conventionally formed initially from two or more separate parts. For an impeller assembly, one part is called the hub, which may or may not contain integrally machined or welded blades. The other is called the cover, which may or may not contain integrally machined or welded blades. These two parts, with at least one part containing integrally machined or welded blades, have conventionally been joined by a brazing method to form an integral assembly called an impeller. Due to the required mechanical properties of the base materials used, a subsequent cooling and quenching treatment is required.

Traditional brazing methods initiate a quenching treatment at a temperature that is just slightly below the liquid phase of the brazing alloy to ensure that the mechanical properties of the base materials are satisfied. While this traditional method is beneficial to the base materials, there is evidence that the strength of the brazed joint is inadequate at these quenching temperatures and, thus, occasionally results in cracking of the brazed joint. This is particularly true in complex shapes, such as an impeller assembly, having cross-sectional thickness variations which cause thermally induced stress upon cooling.

The problem of brazed joint strength has been addressed in a number of ways. U.S. Pat. No. 5,190,596 to Timsit discloses a method of brazing metal surfaces, which utilizes a mixture of a metal and a brazing flux. The metal of the mixture is adapted to form a brazable eutectic with one or both of the surface metals. U.S. Pat. No. 6,112,971 to Castaldo et al. discloses brazing 304L stainless steel parts using an Ni-13Cr-2.8B-4Si-4Fe brazing alloy. U.S. Pat. No. 6,074,604 to Saito et al. discloses a brazing filler metal for brazing stainless steel at low temperatures so as not to adversely affect the properties of the stainless steel while minimizing brittleness in the brazed joint. The brazing filler metal includes 5% to 30% by weight of Mn or Sn, 20% to 70% by weight of Cu, and inevitable impurities, with the balance being Ni. Each of the cited references, while providing some improvement in brazed joint strength and longevity, do not provide the level of brazed joint strength required for high stress applications, such as, for example, the brazed joints of an impeller. Particular concerns in this regard include the development of cracks of the brazed joint and thermal distortion, which is a problem in brazed impeller assemblies.

There is an established need for a brazing method that can provide impeller assemblies with brazed joints having adequate mechanical properties and that are not prone to cracking of the brazed joint.

SUMMARY OF THE INVENTION

The method of brazing according to the present invention comprises the steps of placing a brazing filler metal alloy between stainless steel components; heating the brazing filler metal alloy and stainless steel components over a controlled time period of from 5 to 8 hours from an ambient temperature to a liquidus temperature of the brazing alloy sufficient to effect the desired brazing; cooling the brazed stainless steel assembly in a controlled manner from the solidus temperature of the brazing alloy to a temperature where the brazing alloy has achieved a desired strength level (~1200° F.–1400° F. and then follow by quenching to a temperature below about 400° F. The brazed article may then be tempered or further heat treated depending upon whether the stainless steel components are made from a martensitic or a precipitation hardenable alloy. The present method ensures that the mechanical strength of the brazed joint is sufficient to withstand the induced stresses of a quenching treatment while simultaneously achieving the desired mechanical properties in the stainless steel materials by virtue of the thermal treatment carried out during the brazing process.

The brazing method of the present invention utilizes a brazing filler metal composition, which generally overcomes the deficiencies of the prior art and includes from 80%–85% by weight of gold (Au) and from 15%–20% by weight of nickel (Ni). The preferred brazing alloy typically assumes a liquid phase between 1700° F. and 2100° F. (liquidus temperature).

The present invention further includes the use of specific stainless steel base alloy compositions that may be used with the brazing alloy and method for forming a brazed joint described above. The preferred stainless steel alloy materials discovered as part of the present invention are referred to as a type 17Cr-4Ni precipitation hardenable ("PH") stainless steel alloy and a type 13Cr-4Ni stainless steel alloy. The 17Cr-4Ni PH stainless steel alloy composition used in the present invention includes in % by weight: up to 0.07% carbon; 14–17.7% chromium; 3.5–5.5% nickel; 2.5–5.0% copper; 0.15–0.45% columbium; up to 1.000% manganese; up to 0.004% phosphorus; up to 0.03% sulfur; up to 1.00% silicon; up to 0.05% nitrogen; the balance essentially iron and incidental impurities.

The 13Cr-4Ni stainless steel alloy used in connection with the present invention includes in % by weight: 0.015–0.03% carbon; 12–14% chromium; 3.5–4.5% nickel; 0.3–0.7% molybdenum; 0.3–0.6% silicon; 0.5–1% manganese; up to 0.025% phosphorus; up to 0.005% sulfur; 0.02–0.05% nitrogen; the balance essentially iron and incidental impurities.

According to a preferred embodiment, the brazing alloy and method for forming a brazed joint and preferred stainless steel alloy compositions are used to make an integral impeller assembly. The impeller assembly made by the brazing method described herein also forms an aspect of the present invention.

DETAILED DESCRIPTION OF THE PREFERRED EMBODIMENTS

Figure 1:
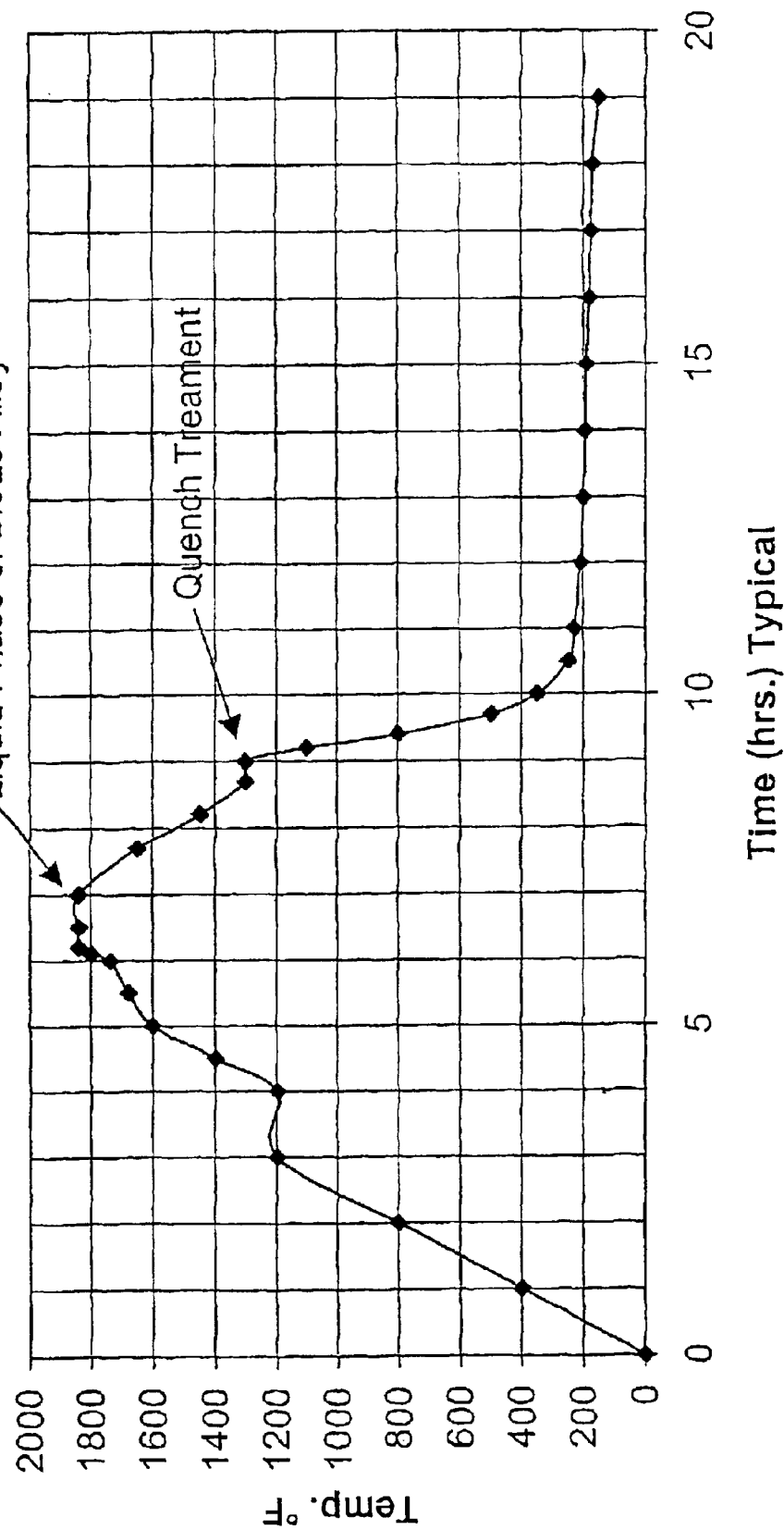
FIG. 1 is a graph of temperature vs. time for a typical brazing thermal cycle of the present invention.

The preferred brazing filler metal alloy composition used in the present invention is intended to provide adequate strength in the resulting stainless steel assembly produced. The brazing filler metal alloy composition generally includes preferably from 80%–85%, more preferably from 81%–84% and, most preferably, from 81.5%–82.5% by weight of Au and preferably from 15%–20%, more preferably from 16%–19% and, most preferably, from 17.5%–18.5% by weight of Ni.

The brazing filler metal alloy is characterized by its ability to assume a liquid phase at a liquidus temperature of between 1700° F.–2100° F., preferably between 1700° F.–1900° F., more preferably between 1740° F.–1840° F. and most preferably at a temperature between 1730° F.–1750° F. A particularly preferred liquid phase temperature for the present brazing alloy is 1740° F. The brazing alloy is further characterized by its ability to assume a sufficiently solid phase of adequate strength at a temperature of preferably between 1200° F.–1500° F., more preferably between 1200° F.–1400° F. and, most preferably, at a temperature between 1300° F.–1350° F. The brazing alloy may be in the form of a foil, strip, wire, powder, or paste, all well-known forms in the brazing art.

Any stainless steel alloy can be used with the brazing filler metal alloy composition in the method of the present invention. It is preferred that the stainless steel components to be brazed be of the same stainless steel alloy composition. It is also preferred that the stainless steel alloy compositions be one of a martensitic stainless steel or a precipitation hardenable stainless steel alloy in order to achieve desired mechanical properties during the thermal treatment carried out during brazing. In this manner, a strong base metal is obtained along with crack-free braze joints. A broad stainless steel alloy composition that can be used with the brazing filler metal alloy composition in the method of the present invention includes up to 0.1% by weight of carbon; from 10%–20% by weight of chromium; from 2%–10% by weight of nickel; up to 1.0% by weight of molybdenum; up to 1.5% by weight of silicon; up to 1.5% by weight of manganese; up to 0.5% by weight of phosphorous; up to 0.1% by weight of sulfur; up to 0.5% by weight of columbium; up to 5% by weight of copper; up to 0.1% by weight of nitrogen; and the balance essentially iron and incidental impurities.

A preferred stainless steel alloy composition particularly useful in the present invention is a type 17Cr-4Ni PH stainless steel. This stainless steel alloy composition includes in % by weight: up to 0.07% carbon; 14%–17.7% chromium; 3.5%–5.5% nickel; 2.5%–5.0% copper; up to 1.000% manganese; up to 0.004% phosphorus; up to 0.03% sulfur; up to 1.00% silicon; up to 0.15%–0.45% columbium; up to 0.05% nitrogen; the balance being essentially iron and incidental impurities.

Another presently preferred stainless steel alloy composition useful in practicing the invention is a type 13Cr-4Ni stainless steel. The 13Cr-4Ni stainless steel alloy includes in % by weight: 0.015%–0.03% carbon; 12%–14% chromium; from 3.5%–4.5% nickel; from 0.3%–0.7% molybdenum; from 0.3%–0.6% silicon; from 0.5%–1% manganese; up to 0.025% phosphorus; up to 0.005% sulfur; from 0.02%–0.05% nitrogen; the balance being essentially iron and incidental impurities.

The present invention is specifically directed to a method for brazing stainless steel components to produce a stainless steel assembly or article, particularly an impeller assembly. The brazing method generally includes the steps of placing a brazing alloy containing in % by weight preferably from 80%–85%, more preferably from 81%–84% and, most preferably, from 81.5%–82.5% gold (Au) and preferably 15%–20%, more preferably from 16%–19% and, most preferably, from 17.5%–18.5% nickel (Ni), between the shaped stainless steel components of a selected composition and shape for forming the article; placing the stainless steel components into a controlled atmosphere furnace capable of maintaining one of an inert environment or vacuum environment; raising the temperature of the furnace, of the brazing alloy, and of the stainless steel components in a controlled manner over a period of time of between 5 hours and 8 hours, from ambient temperature to a stabilized liquidus temperature of the brazing alloy, preferably between 1700° F.–2100° F., more preferably between 1700° F.–1900° F. and, most preferably, between 1800° F.–1875° F.; decreasing the temperature of the furnace and of the stainless steel components in a controlled manner from the liquidus temperature of the brazing alloy to a temperature where the brazing alloy assumes a sufficiently solid phase of adequate strength of preferably between 1200° F.–1400° F., more preferably 1250° F.–1350° F. and, most preferably, from 1275° F.–1325° F., over a period of 30 minutes to 5 hours; and then gas quenching the brazed stainless steel assembly in a non-oxidizing gas medium of argon or nitrogen to a temperature of less than about 400° F.

The brazing filler metal alloy used in the above-described method may be in the form of a foil, strip, wire, powder, or paste. The brazing alloy may be placed directly in a gap between the stainless steel components to be joined. The gap between the components is preferably controlled at a dimension of between about 0.001" to 0.004" but can go as high as 0.01" to 0.014" in some circumstances. Alternatively, or additionally, the brazing alloy may be applied in close proximity to or at the position where the brazed joint is expected to form.

The brazing filler metal alloy and brazing method of the present invention have been found to be particularly useful when used to form an article, known as an integral impeller assembly which has complex geometric shapes of varying cross section. Impeller assemblies produced using the method of the present invention develop fewer cracks in the brazed joints than prior art brazed impeller assemblies and also demonstrate minimal thermal distortion as a result of the novel thermal treatment carried out. The method of the present invention, thus, allows for the manufacture of high quality brazed assemblies of complex geometries, such as impeller assemblies, made from stainless steel.

A presently preferred method for producing integral impeller assemblies comprises the steps of placing a brazing alloy comprising in % by weight from 81.5%–82.5% gold (Au) and from 17.5%–18.5% nickel (Ni) between two stainless steel components, preferably hub and cover components, both stainless steel components having the same composition being either 17Cr-4Ni PH stainless steel or 13Cr-4Ni stainless steel alloy; placing the stainless steel components into a controlled atmosphere furnace capable of maintaining one of an inert or vacuum environment; raising the temperature of the furnace, the brazing alloy and the stainless steel components in a controlled manner over a period of time of between 5.5–6.5 hours, from ambient temperature to the stabilized liquidus temperature of the brazing alloy, typically between 1700° F.–1900° F.; maintaining the temperature for 30–90 minutes to fully melt the brazing filler metal alloy; decreasing the temperature of the furnace and of the resulting brazed stainless steel impeller in a controlled manner from the liquidus temperature of the brazing alloy to a temperature of 1300° F.–1350° F. over a period of 1–3 hours, where the brazing alloy assumes a sufficiently solid phase of adequate strength on the order of about 25–30 Ksi; and quenching the brazed stainless steel impeller in a non-oxidizing or non-carburizing gas medium such as argon or nitrogen in order that the temperature of the stainless steel impeller assembly decreases from 1300° F.–1350° F. to a temperature of less than 400° F. within a period of less than 2 hours. This quenching causes a phase transformation from austenite to martensite to increase strength and hardness in a 13Cr-4Ni stainless steel alloy. A post quenching, tempering step may also be conducted for a martensitic steel such as the type 13Cr-4Ni to provide a tempered martensitic structure or a post quenching, hardening heat treatment step may be conducted for a precipitation hardening steel such as the 17Cr-4Ni alloy so as to provide a Cu-type precipitate for strengthening/hardening purposes.

FIG. 1 shows a typical thermal cycle for the preferred method for producing integral impeller assemblies according to the instant invention. In FIG. 1, the assembly to be brazed was heated to approximately 1850° F., the liquid phase or liquidus temperature of the brazing alloy, approximately over a 6 hour period and held at that temperature for approximately one hour. The brazed assembly was cooled over about a 2-hour period to approximately 1300° F. The brazed assembly was then gas quenched down to a temperature of about 350° F. over about a one-hour time period. The impeller assembly exhibited no thermally induced distortion and all of the brazed joints were sound and crack-free.

The present invention further includes an integral impeller assembly produced by the above-described method. A preferred integral impeller assembly of the present invention includes a hub, a cover, and blades all being comprised of either 17Cr-4Ni PH steel or 13Cr-4Ni steel; the hub and cover are joined together by a brazed joint formed from a brazing filler metal alloy which preferably includes 81.5%–82.5% by weight of Au and 17.5%–18.5% by weight of Ni.

An impeller assembly consists of three main parts. These three parts include the impeller hub, the impeller cover and a plurality of impeller blades. During the fabrication of the impeller, the impeller blades can either be machined integral with either the hub or the cover or can be made separately and then attached to either the hub or cover by means of welding. Once the blades have been attached to either the hub or the cover, the part containing the blades is attached by brazing the exposed blade edges to the part not containing the blades, forming the final impeller assembly. In the case of the present invention, the final impeller assembly is achieved by the present method of brazing.

Figure 2:
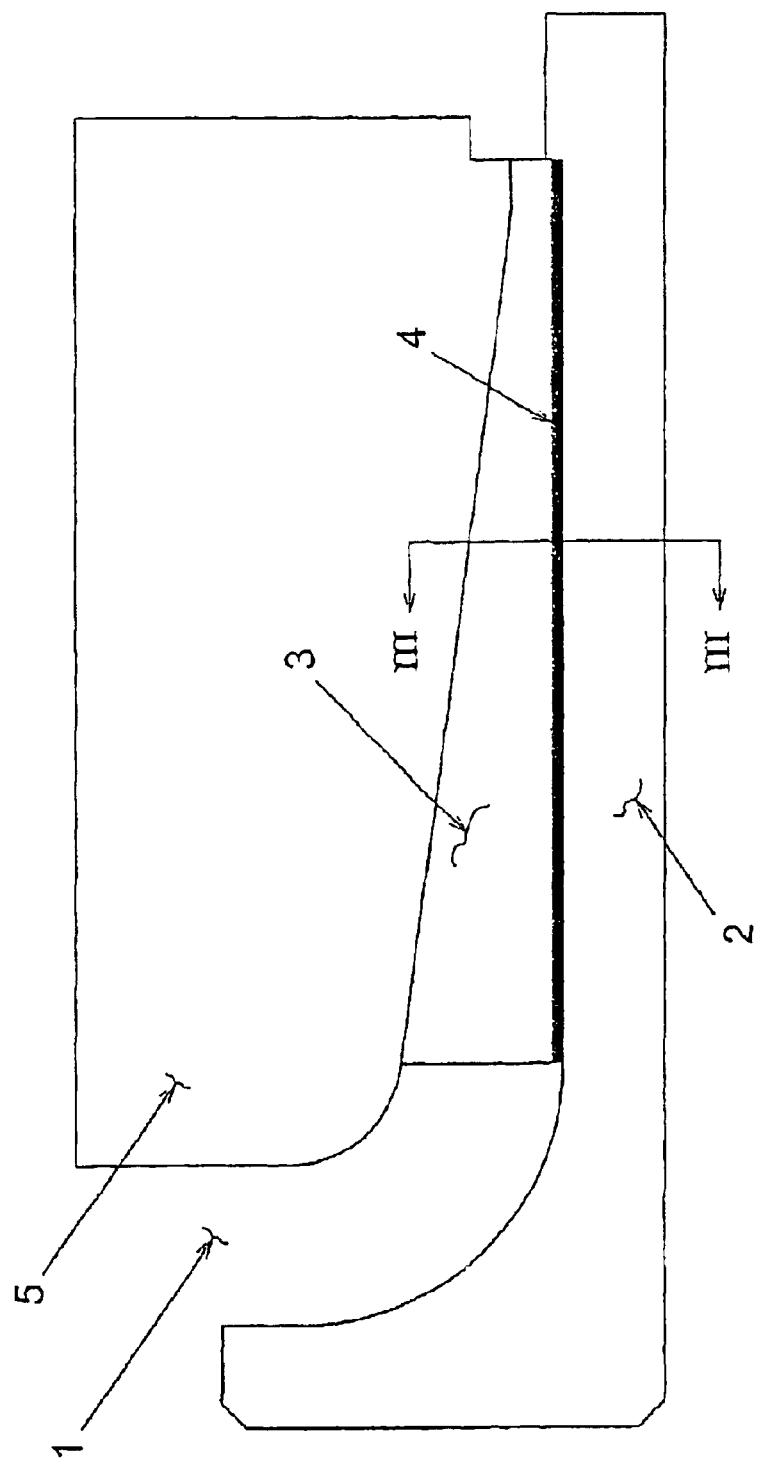
FIG. 2 is a fragmented side elevation view of an integral impeller assembly which includes a cover carrying an integral blade, a hub, and a brazed joint.

In FIG. 2, an integral impeller assembly 1 includes a cover 5 carrying an integral blade 3 machined therein, and a hub 2. Integral blade 3 is bonded or joined to a surface of hub 2 by way of a brazed joint 4. The brazed joint 4 is formed by placing the brazing filler metal alloy described herein between an exposed edge of the integral blade 3 and the hub 2 and subjecting the integral impeller assembly 1 to the brazing method of the present invention. Of course, it is understood that an impeller assembly comprises a plurality of blades 3 which will require simultaneous brazing in accordance with the invention.

Figure 3:
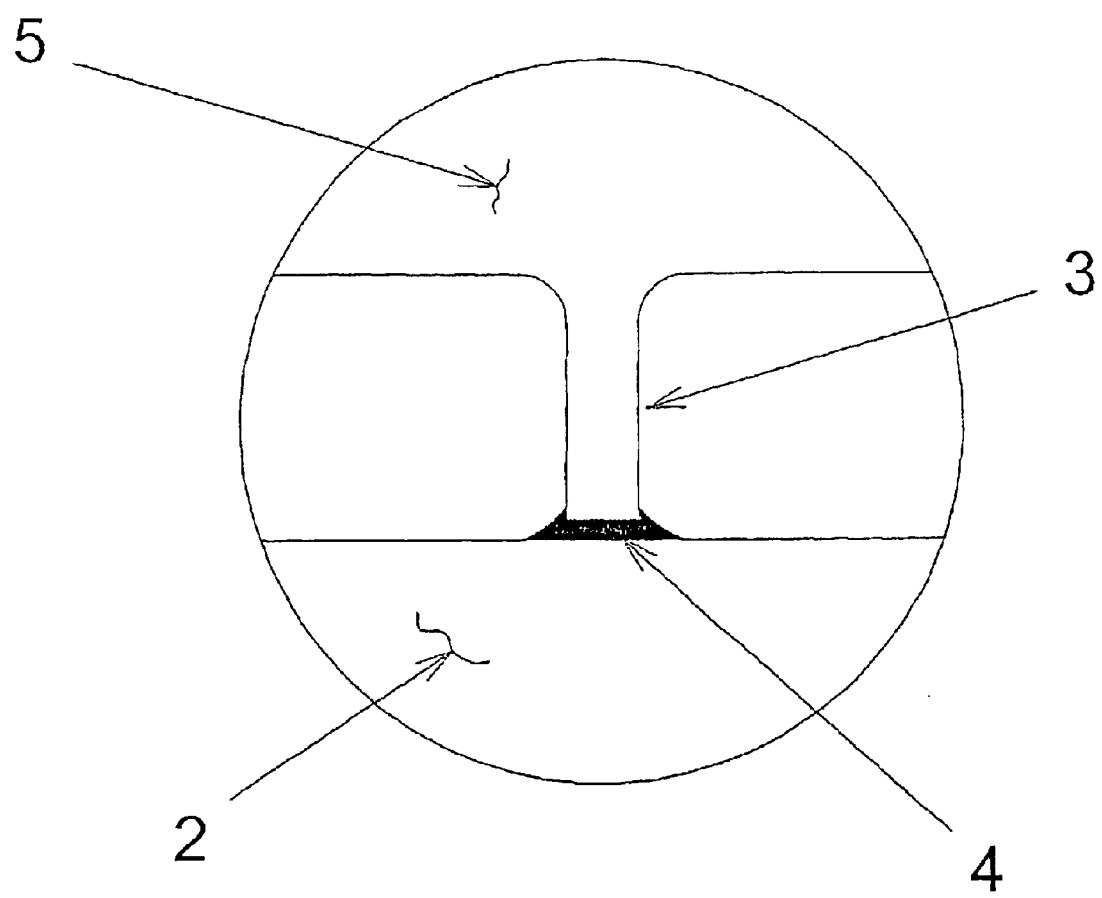
FIG. 3 is a cross section taken along section line III—III of FIG. 2 showing the location of the cover, blade, hub, and brazed joint.

FIG. 3 is a cross section of the integral impeller assembly 1 showing cover 5 with integral blade 3 joined to hub 2 by the brazed joint 4.

Typically, the following steps are included in order to achieve the final brazed impeller assembly 1 of the present invention. Small strips of the brazing filler metal alloy are placed on the exposed edges of the impeller blades 3. The part (the hub or the cover) not carrying the integral blades is then placed in contact with the exposed edges of the impeller blades, and the brazing filler metal alloy which forms the brazed joint 4 and, thence, the impeller assembly. Additional brazing alloy in the form of paste or wire is placed along the side of the blade forming the brazed joint. The impeller assembly is then placed in a controlled atmosphere furnace of argon or under vacuum and heated to the liquidus temperature of the brazing alloy.

Figure 4:
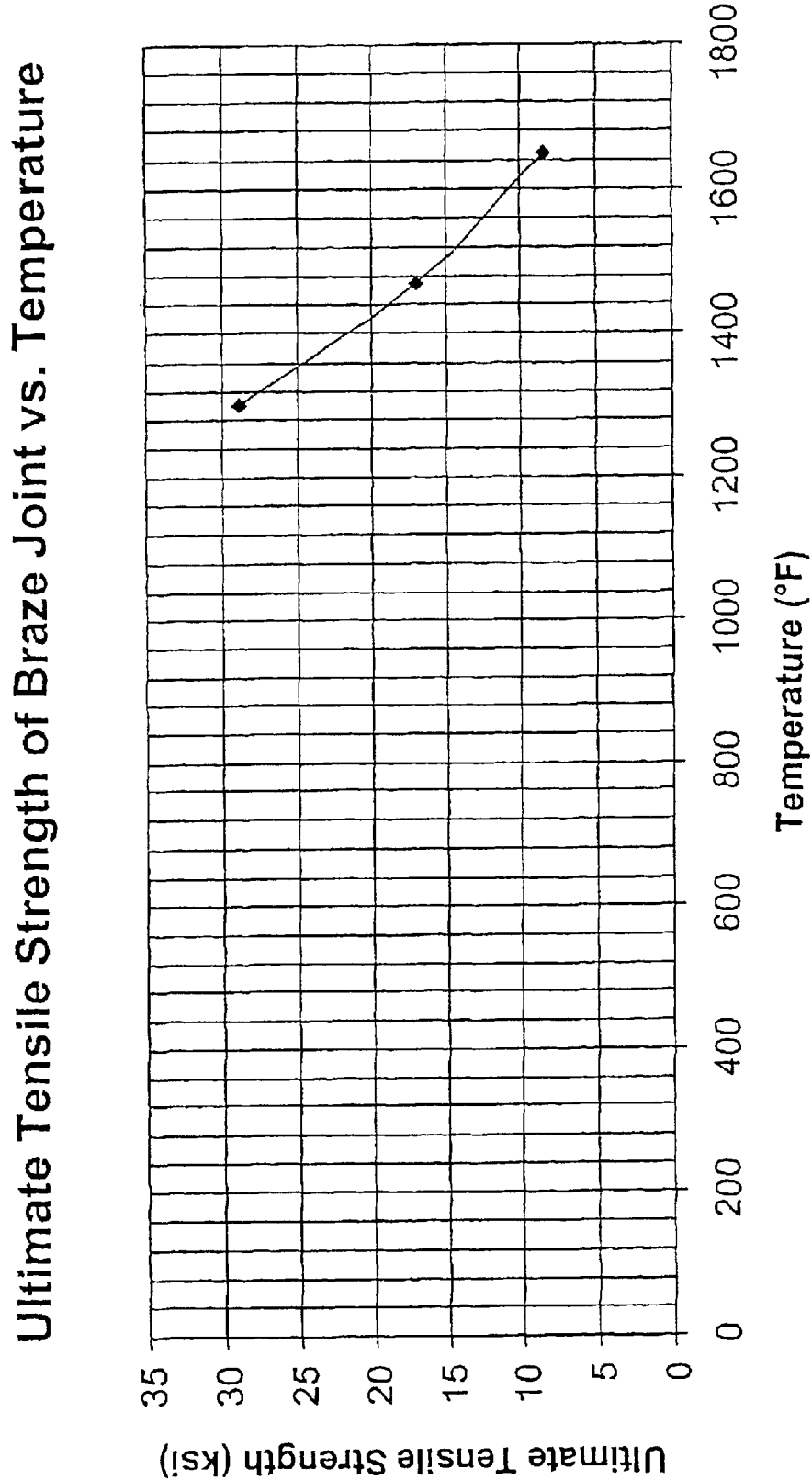
FIG. 4 is a graph of ultimate tensile strength of a brazed joint vs. temperature of a brazed joint made in accordance with the present invention.

Traditional brazing methods which use the proposed stainless steel materials according to the invention would normally begin a quenching operation which occurs just below the liquidus temperature of the brazing alloy. FIG. 4 shows a curve which represents the strength of the brazing joint at various temperatures. The data show that the strength of the brazed joint is very low (approximately 9,000 Ksi) when quenched at a temperature just below the liquidus temperature (~1750° F.) of the brazed joint. It also shows that as the quench temperature decreases from the liquidus temperature, the strength of the brazed joint increases. Due to the complex geometry of a typical impeller assembly, much stress is induced on the brazed joint when the assembly is quenched. In order to produce a brazed joint without cracking, the present invention recognizes that the temperature at which the quenching operation begins must be one at which the brazed joint has adequate strength.

FIG. 4 shows a typical ultimate tensile strength vs. quench temperature curve for a brazed joint of an integral impeller assembly of the present invention. The integral impeller assembly demonstrates that minimal thermal distortion or cracking of the brazed joint occurs when the brazed assembly is quenched from a temperature of about 1250° F. because the tensile strength of the brazed joint 4 is almost 30 Ksi.

The data in FIG. 4 show that the brazed joint of the present invention has almost three times more strength when quenches at 1250° F.–1300° F. than at the 1650° F. quench temperature of the prior art. Conversely, if the temperature at which quenching begins is too low, then the final properties of the stainless steel base metal will not be achieved since the stainless steel metals disclosed herein require either a solution anneal condition or a gas quench condition followed by either an age hardening or tempering heat treatment after brazing. The time and temperature parameters chosen for the brazing step and for the initiation of the quenching step in the present invention satisfy the thermal treatment requirements of the preferred impeller base metals disclosed herein. A post quenching step may involve a tempering step conducted at 950° F.–1250° F., or preferably at about 950° F.–1120° F. to provide a tempered martensitic structure in the 13Cr-4Ni alloy described above. A post quenching step may alternatively involve a heat treating step conducted at about 1100° F. for about 1–4 hours followed by air cooling to provide a copper-type precipitate for hardening/strengthening purposes in the 17Cr-4Ni PH alloy. In some instances for large cross sections, a slow furnace cool to less than 800° F. may be desirable to avoid thermally induced distortion.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A method of forming a brazed joint between stainless steel components comprising the steps of:
   (a) providing at least two stainless steel components of a selection composition and configuration;
   (b) providing a brazing filler metal alloy of a selected composition compatible with the composition of said stainless steel components;
   (c) placing the brazing filler metal alloy in or adjacent to a gap formed between the at least two stainless steel components to be joined;
   (d) heating said stainless steel components and said brazing alloy in a controlled manner from an ambient temperature to a liquidus temperature of said brazing alloy to produce a brazed assembly;
   (e) cooling said brazed assembly in a controlled manner from said liquidus temperature to a temperature of 1200° F.–1400° F. where said brazing alloy has achieved a desired strength level; and
   (f) quenching said cooled, brazed assembly of step (e) to a temperature of less than 400° F.

2. The method of claim 1 wherein said brazing alloy and stainless steel components are heated to a liquidus temperature of 1740° F.–2100° F. in step (d).

3. The method of claim 1 wherein the selected composition of the stainless steel components provided in step (a) is one of a 17Cr-4Ni PH alloy or a 13Cr-4Ni martensitic alloy; and
   wherein the brazing filler metal alloy provided in step (b) comprises 80%–85% by weight Au and 15%–20% by weight Ni.

4. The method of claim 1 wherein the brazing alloy is in the form of a foil, strip, wire, powder or paste.

5. The method of claim 1 wherein the gap of step (c) has a width of 0.001" to 0.014".

6. A method of joining stainless steel components by brazing, comprising the steps of:
   (a) providing at least two stainless steel components of a selected configuration and of a selected composition, selected from one of a 17Cr-4Ni PH alloy or a 13Cr-4Ni martensitic alloy;
   (b) providing a brazing filler metal alloy comprising 80%–85% by weight Au and 15%–20% by weight Ni;
   (c) placing the brazing filler metal alloy in or adjacent to a gap formed between the at least two stainless steel components to be joined;
   (d) heating said stainless steel components and said brazing alloy over a period of time from 5 to 8 hours from an ambient temperature to a liquidus temperature of between 1740° F. to 2100° F.;
   (e) cooling said brazed assembly over a period of time of from ½ to 5 hours from said liquidus temperature to a temperature of between 1200° F.–1400° F.; and
   (f) quenching said cooled, brazed assembly of step (e) from the temperature of between 1200° F.–1400° F. to a temperature of less than 400° F. in a time of less than 2 hours.

7. The method of claim 6 wherein the selected stainless steel composition is said 17Cr-4Ni PH, which comprises in % by weight:
   14%0–17.7% chromium;
   3.5%–5.5% nickel;
   2.5%–5.0% copper;
   0.15%–0.45% columbium;
   up to 0.07% carbon;
   up to 1.000% manganese;
   up to 0.004% phosphorus;
   up to 0.03% sulfur;
   up to 1.00% silicon;
   up to 0.05% nitrogen;
   the balance essentially iron and incidental impurities.

8. The method of claim 6 wherein the selected stainless steel composition is said 13Cr-4Ni martensitic alloy, which comprises in % by weight:
   0.015%–0.03% carbon;
   12%–14% chromium;
   3.5%–4.5% nickel;
   0.3%–0.7% molybdenum;
   0.3%–0.6% silicon;
   0.5%–1% manganese;
   up to 0.025% phosphorus;
   up to 0.005% sulfur;
   0.02%–0.05% nitrogen;
   the balance essentially iron and incidental impurities.

9. The method of claim 6 wherein the liquidus temperature of heating step (d) is between 1800° F. to 1875° F.

10. The method of claim 6 wherein the cooling step (e) is conducted from the liquidus temperature to a temperature of between 1275° F. to 1325° F., followed by said quenching step (f).

11. A method of making an impeller assembly by brazing, comprising the steps of:
   (a) providing at least two stainless steel components of a selected configuration and of a selected composition, selected from one of a 17Cr-4Ni PH alloy or a 13Cr-4Ni martensitic alloy;
   (b) providing a brazing filler metal alloy comprising 80%–85% by weight Au and 15%–20% by weight Ni;
   (c) placing the brazing filler metal alloy in or adjacent to a gap formed between the at least two stainless steel components to be joined;
   (d) heating said stainless steel components and said brazing alloy over a period of time from 5 to 8 hours from an ambient temperature to a liquidus temperature of between 1740° F. to 2100° F.;
   (e) cooling said brazed assembly over a period of time of from ½ to 5 hours from said liquidus temperature to a temperature of between 1200° F.–1400° F.; and
   (f) quenching said cooled, brazed assembly of step (e) from the temperature of between 1200° F.–1400° F. to a temperature of less than 400° F. in a time of less than 2 hours.

12. The method of claim 11 wherein the selected stainless steel composition is said 17Cr-4Ni PH, which comprises in % by weight:
   14%0–17.7% chromium;
   3.5%–5.5% nickel;
   2.5%–5.0% copper;

0.15%–0.45% columbium;
up to 0.07% carbon;
up to 1.000% manganese;
up to 0.004% phosphorus;
up to 0.03% sulfur;
up to 1.00% silicon;
up to 0.05% nitrogen;
the balance essentially iron and incidental impurities.

13. The method of claim 11 wherein the selected stainless steel composition is said 13Cr-4Ni martensitic alloy, which comprises in % by weight:
0.015%–0.03% carbon;
12%–14% chromium;
3.5%–4.5% nickel;
0.3%–0.7% molybdenum;
0.3%–0.6% silicon;
0.5%–1% manganese;
up to 0.025% phosphorus;
up to 0.005% sulfur;
0.02%–0.05% nitrogen;
the balance essentially iron and incidental impurities.

* * * * *